(12) United States Patent
Chapman et al.

(10) Patent No.: US 10,064,109 B2
(45) Date of Patent: *Aug. 28, 2018

(54) METHOD FOR ADAPTING CELL CHANGE TIME IN A MULTI-CELL WIRELESS COMMUNICATION NETWORK

(71) Applicant: Telefonaktiebolaget LM Ericsson (Publ), Stockholm (SE)

(72) Inventors: Thomas Chapman, Solna (SE); Muhammad Kazmi, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/267,884

(22) Filed: Sep. 16, 2016

(65) Prior Publication Data

US 2017/0006507 A1 Jan. 5, 2017

Related U.S. Application Data

(63) Continuation of application No. 14/653,064, filed as application No. PCT/SE2015/050500 on May 6, 2015, now Pat. No. 9,462,524.

(60) Provisional application No. 61/989,171, filed on May 6, 2014.

(51) Int. Cl.
| | |
|---|---|
| *H04W 4/00* | (2018.01) |
| *H04W 36/00* | (2009.01) |
| *H04W 36/14* | (2009.01) |
| *H04W 56/00* | (2009.01) |
| *H04W 8/24* | (2009.01) |
| *H04W 88/06* | (2009.01) |

(52) U.S. Cl.
CPC ... *H04W 36/0055* (2013.01); *H04W 36/0016* (2013.01); *H04W 36/0027* (2013.01); *H04W 36/14* (2013.01); *H04W 56/001* (2013.01); *H04W 8/24* (2013.01); *H04W 36/0061* (2013.01); *H04W 88/06* (2013.01)

(58) Field of Classification Search
CPC ......... H04W 36/0016; H04W 36/0027; H04W 56/001; H04W 88/06
USPC ............................................. 455/422.1, 436
See application file for complete search history.

(56) References Cited

U.S. PATENT DOCUMENTS

2011/0249577 A1 10/2011 Chin et al.
2011/0275374 A1 11/2011 Narasimha et al.

OTHER PUBLICATIONS

International Search Report and Written Opinion dated Oct. 12, 2015 for International Application No. PCT/SE2015/050500, International Filing Date—May 6, 2015 consisting of 14-pages.

(Continued)

*Primary Examiner* — Charles Shedrick
(74) *Attorney, Agent, or Firm* — Sage Patent Group

(57) ABSTRACT

A method and system for performing cell change by a wireless device are disclosed. According to one aspect, the cell change is from a first group of cells of a first radio access technology, RAT, to a second group of cells of a second RAT. Performance of a cell change includes receiving a cell change command. In response to the cell change command, the wireless device synchronizes to interoperate with a first cell of the second group of cells of the second RAT within a first specified period of time. The wireless device synchronizes to interoperate with at least one remaining cell of the second group of cells of the second RAT within a second specified period of time ending after an end of the first specified period of time.

27 Claims, 3 Drawing Sheets

(56) References Cited

OTHER PUBLICATIONS

3GPP TS 36.331 V12.1.0 (Mar. 2014) 3rd Generation Partnership Project; Technical Specification Group Radio Access Network; Evolved Universal Terrestrial Radio Access (E-UTRA); Radio Resource Control (RRC); Protocol Specification (Release 12) Mar. 19, 2014 consisting of 356-pages.

3GPP TS 25.331 V12.1.0 (Mar. 2014) 3rd Generation Partnership Project; Technical Specification Group Radio Access Network; Radio Resource Control (RRC); Protocol specification (Release 12) Mar. 20, 2014,abstract, Section 13.3.1, consisting of 1-page.

3GPP TS 25.214 V11.9.0 (Jun. 2014) 3rd Generation Partnership Project; Technical Specification Group Radio Access Network; Physical layer procedures (FDD) (Release 11) Jul. 3, 2014 consisting of 128-pages.

Extended European Search Report and dated Sep. 27, 2017 for European Application No. 157888579, International Filing Date—May 6, 2015 consisting of 12-pages.

3GPP TS 25.133 V10.11.0 (Dec. 2013) 3rd Generation Partnership Project; Technical Specification Group Radio Access Network; Requirements for support of radio resource management (FDD) (Release 10) Dec. 2013, consisting of 278-pages.

METHOD FOR ADAPTING CELL CHANGE TIME IN A MULTI-CELL WIRELESS COMMUNICATION NETWORK

CROSS-REFERENCE TO RELATED APPLICATIONS

This application is a continuation of U.S. patent application Ser. No. 14/653,064, filed Jun. 17, 2015, which is a Submission Under 35 U.S.C. § 371 for U.S. National Stage Patent Application of International Application No. PCT/SE2015/050500, filed May 6, 2015 entitled "METHOD FOR ADAPTING CELL CHANGE TIME IN A MULTI-CELL WIRELESS COMMUNICATION NETWORK," which claims priority to U.S. Provisional Application No. 61/989,171, filed May 6, 2014, entitled " METHOD FOR ADAPTING HANDOVER TIME IN MULTICARRIER HANDOVER," the entirety of all of which are incorporated herein by reference.

TECHNICAL FIELD

The present invention relates to wireless communications and in particular, to adapting cell change time in a multi-cell wireless communication network.

BACKGROUND

Supporting mobility for active users is an essential component of any cellular communication system. In this context, mobility refers to the ability of the system to migrate a user's active connection from one cell to a different cell without interrupting the service, i.e. handover, also referred to as cell change. Handover may take place between geographically non-coinciding cells on the same carrier (intra-frequency handover), between cells on different carriers which may be covering the same geographic area or different areas (inter-frequency handover) or even between different Radio Access Technologies (RATs) which may or may not be covering the same geographic area (inter-RAT handover).

While in active mode, a wireless device, e.g., user equipment (UE), may be commanded to make measurements on the same carrier, different carriers or different RATs, and to report these measurements to a network node when the measurement values exceed a pre-defined threshold. The network node may take into account these measurements and instruct the wireless device to hand over the connection of the wireless device from one cell to another cell. Once the wireless device receives the command to change cells, the wireless device must stop receiving data from the old cell, re-configure with the parameters of the new cell, or re-tune the wireless device receiver in the cases of inter-frequency or inter-RAT handover, synchronize to the new cell and then begin receiving data.

In order to maintain call continuity, the interruption time between the handover command being received and the handover being completed should be minimized such that the wireless device can start receiving data in the new cell. The 3rd Generation Partnership Project (3GPP) wireless communication standard specifications set requirements for the maximum allowable interruption time during a handover for all types of intra-frequency, inter-frequency and inter-RAT handovers for Global System for Mobile Communications (GSM), Universal Terrestrial Radio Access Network (UTRAN) and Enhanced-UTRAN (E-UTRAN) based networks.

In order to improve user experience, so called multicarrier, or carrier aggregation has been introduced into both Universal Terrestrial Radio Access (UTRA) and Enhanced-UTRA (E-UTRA). In UTRA, multicarrier operation enables a wireless device to be configured and simultaneously served from up to 8 High-Speed Downlink Packet Access (HSDPA) cells. Similarly, for E-UTRA, a user may be configured to receive simultaneously on more than one carrier. The purpose of receiving on multiple carriers is to increase the total bandwidth available for serving the user and thus increase the available transfer rates and user experience.

The current 3GPP specifications provide for handing over a wireless device that is being served from an E-UTRA cell in active mode to UTRA. However, currently, the handover can take place to only one UTRA carrier. E-UTRA can operate with significantly higher bandwidths than UTRA, and thus following handover, the user will potentially at first experience a significantly reduced throughput compared to the E-UTRA throughput. For example, if a wireless device is handed over from a 20 MHz E-UTRA carrier to a 5 MHz UTRA carrier, then only one quarter of the pre-handover bandwidth is available after handover. It is possible following handover for the UTRA network to configure multicarrier operation, but this adds additional delays before the previous quality of user experience can be reached.

The situation could be improved by enabling a handover from E-UTRA directly to multicarrier UTRA operation. However in that case, more time may be required by the wireless device to implement the reconfiguration, re-tuning and synchronization for all of the UTRA cells. This additional time could increase the interruption time and the increased handover interruption time could potentially endanger the integrity of the service.

SUMMARY

The present disclosure advantageously provides a method and device for performing cell change by a wireless device. According to one aspect, the cell change is from a first group of cells to a second group of cells. Performance of a cell change includes receiving a cell change command. In response to the cell change command, the wireless device synchronizes to interoperate with a first cell of the second group of cells within a first specified period of time. The wireless device synchronizes to interoperate with at least one remaining cell of the second group of cells within a second specified period of time ending after an end of the first specified period of time.

According to this aspect, in some embodiments, the performance of cell change further includes commencing transmission of a signal from the wireless device on the first cell after the end of the first period of time but before the end of the second period of time. In some embodiments, each cell of the first group of cells is transmitted on a different carrier, and each cell of the second group of cells is transmitted on a different carrier. In some embodiments, the first cell is a secondary cell and the at least one remaining cell includes a primary cell. In some embodiments, the synchronizing of the wireless device to interoperate with at least one remaining cell begins after the synchronizing of the wireless device to interoperate with the first cell. In some embodiments, the synchronizing of the wireless device to interoperate with the at least one remaining cell begins during the synchronizing of the wireless device to interoperate with the first cell. In some embodiments, the first group of cells are of a first radio access technology, RAT, and the second group of cells are of a second RAT different from the first RAT. In some embodiments, the first RAT is Enhanced Universal Terrestrial Radio Access, E-UTRA, and the second RAT is Universal Terrestrial Radio Access, UTRA.

In some embodiments, the first specified period of time is a time between receiving the cell change command and transmitting by the wireless device on a Dedicated Physical Control Channel, DPCCH. In some embodiments, the second specified period of time is a time between receiving the cell change command and scheduling by the wireless device of a high speed shared control channel, HS-SCCH, on at least one of the at least one remaining cells. In some embodiments, the second specified period of time is a time between receiving the cell change command and transmitting by the wireless device of a dedicated physical control channel, DPCCH, on at least one of the at least one remaining cells.

In some embodiments, the cell change command is a handover command. In some embodiments, the second specified period of time is given by:

$$T\text{interrupt3}=TIU+T\text{sync}+OC*150+KC*50+10*F\text{max ms}$$

where TIU is an interruption uncertainty when changing from an Enhanced Universal Terrestrial Radio Access, E-UTRA, technology to a Universal Terrestrial Radio Access, UTRA, technology, FMAX denotes a maximum number of radio frames within transmission time intervals, TTI, of all transport channels that are multiplexed into a same coded composite transport channel, CCTrCH, on a target cell of the UTRA, TSYNC is a time required for measuring a downlink dedicated physical control channel, DPCCH, KC is a number of known target cells in a message, and OC is a number of target cells that are not known in the message.

According to another aspect, some embodiments include a wireless device configured to handover from a first group of cells to a second group of cells. The wireless device includes, a memory, a processor and a receiver module. The memory is configured to store a first specified period of time and a second specified period of time. The processor is in communication with the memory and is configured to receive a cell change command; synchronize the wireless device to interoperate with a first cell of the second group of cells within the first specified period of time; and synchronize the wireless device to interoperate with at least one remaining cell of the second group of cells within the second specified period of time that ends after and end of the first period of time. The receiver module is configured to receive a cell change command from a base station serving the first group of cells.

According to this aspect, in some embodiments, the wireless device further includes a transmitter module configured to begin transmitting a signal from the wireless device on the first cell after the end of the first period of time but before the end of the second period of time. In some embodiments, each cell of the first group of cells is transmitted on a different carrier, and each cell of the second group of cells is transmitted on a different carrier. In some embodiments, the first group of cells is transmitted using one RAT and the second group of cells is transmitted using a second RAT. In some embodiments, the first cell is a primary cell and the at least one remaining cell is a secondary cell. In some embodiments, the first cell is a secondary cell and the at least one remaining cell includes the primary cell. In some embodiments, the synchronizing of the wireless device to interoperate with the at least one remaining cells begins after the synchronizing of the wireless device to interoperate with the first cell. In some embodiments, the synchronizing of the wireless device to interoperate on the at least one remaining cells begins during the synchronizing of the wireless device to interoperate on the first carrier. In some embodiments, the second specified period of time is given by:

$$T\text{interrupt3}=TIU+T\text{sync}+OC*150+KC*50+10*F\text{max ms}$$

According to yet another aspect, some embodiments provide a wireless device configured to handover from a first group of cells to a second group of cells. The wireless device includes a memory module configured to store a first specified period of time and a second specified period of time. The wireless device also includes a receiver module configured to receive a cell change command. The wireless device further includes a first synchronization module configured to synchronize the wireless device to interoperate with a first cell of the second group of cells within the first specified period of time. The wireless device also includes a second synchronization module configured to synchronize the wireless device to interoperate with the at least one remaining cell of the second group of cells within the second specified period of time that ends after an end of the first period of time.

According to this aspect, in some embodiments, the wireless device further includes a transmit module configured to begin transmitting signals from the wireless device on the first cell after the end of the first period of time but before the end of the second period of time. In some embodiments, the first group of cells is transmitted using one RAT and the second group of cells is transmitted using a second RAT. In some embodiments, the first RAT is Enhanced Universal Terrestrial Radio Access, E-UTRA, and the second RAT is Universal Terrestrial Radio Access, UTRA. In some embodiments, the first specified period of time is a time between receiving the cell change command and transmitting by the wireless device on a Dedicated Physical Control Channel, DPCCH. In some embodiments, the second specified period of time is a time between receiving the cell change command and scheduling by the wireless device of a high speed shared control channel, HS-SCCH, on at least one of the at least one remaining cell. In some embodiments, the second specified period of time is a time between receiving the cell change command and transmitting by the wireless device of a dedicated physical control channel, DPCCH, on at least one of the at least one remaining cell. In some embodiments, the second specified period of time is given by:

$$T\text{interrupt3}=TIU+T\text{sync}+OC*150+KC*50+10*F\text{max ms}$$

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
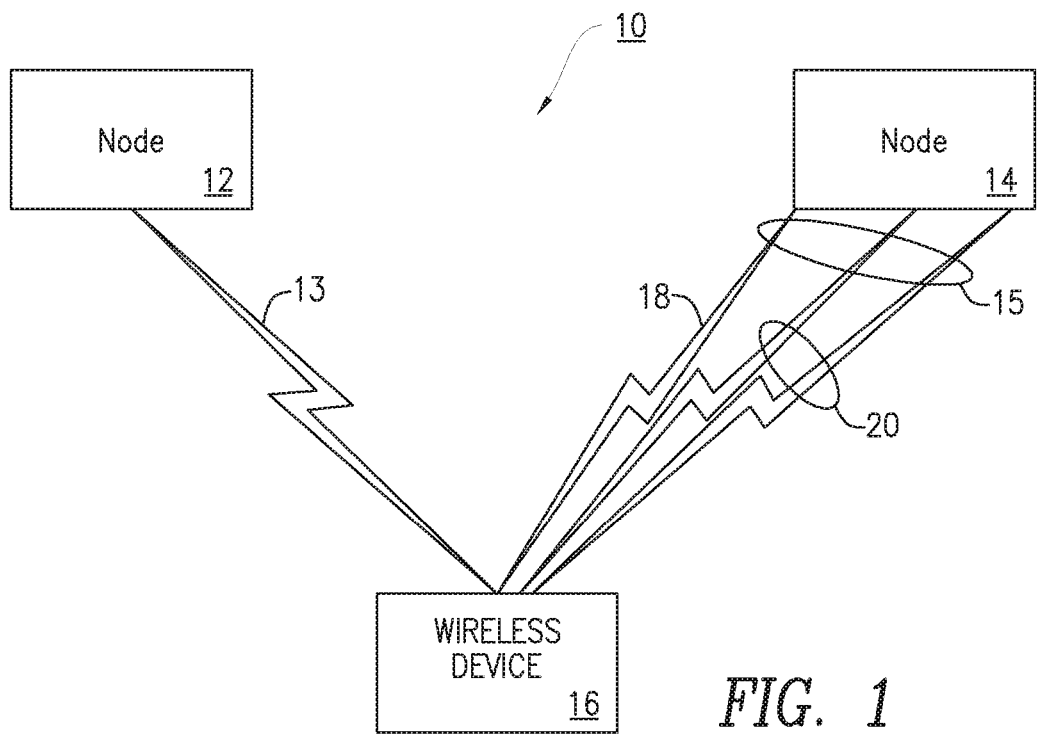
FIG. 1 is a block diagram of a multi-cell wireless communication network.

Before describing in detail exemplary embodiments that are in accordance with the present disclosure, it is noted that the embodiments reside primarily in combinations of apparatus components and processing steps related to adapting handover time in a multicarrier wireless communication system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. Also, although the disclosure is presented using the terms "cells" and handing off from one group of cells to another, it is understood that this arrangement can also be interpreted as handing off from one group of carriers to another. In other words, a cell can be a carrier as used herein.

With high speed downlink packet access (HSDPA) multicarrier operation, one of the HSDPA serving cells is denoted as the primary cell and other serving cells are denoted as secondary serving cells. According to some embodiments, when the wireless device receives a cell change command from an E-UTRAN base station that indicates that the wireless device should hand over to multiple HSDPA carriers, the wireless device prioritizes completion of the handover to the primary carrier over handover to the secondary carriers. Prioritizing handover to the primary carrier ensures the integrity of the call, since availability of the primary carrier means that the connection between the wireless device and the network is re-established as quickly as possible, and at least 5 MHz of bandwidth is available for QoS sensitive services.

Embodiments are described herein in the context of an E-UTRA to UTRA handover. However, embodiments could include handover from a GSM to UTRA, GSM to E-UTRA or UTRA to E-UTRA. The methods described herein could be applied for a wireless local area network (WLAN) to UTRA handover or WLAN to E-UTRA handover. UTRA in this context refers to HSPA, including both high speed downlink packet access (HSDPA) and high speed uplink packet access (HSUPA). It is noted that the disclosure is not limited only to the above-listed radio access technologies. It is contemplated that embodiments could include other wireless communication networks and radio access technologies.

In the case of E-UTRA to UTRA handover (HO), the wireless device receives a cell change command via RRC signaling (which may also contain an RRC Connection Reconfiguration message) from the currently serving network node, e.g., eNodeB. In case of UTRA to E-UTRA HO, the wireless device receives a cell change command via RRC signaling from the currently serving network node, e.g., a radio network controller (RNC). In the cases of GSM to E-UTRA or UTRA HO, the wireless device receives the cell change command via layer 3 signaling from the currently serving network node, e.g., a base station controller (BSC). The wireless device or user equipment (wireless device) can be any wireless device including devices used for machine type communication, machine to machine communication, sensors, USB, wireless embedded device, laptop mounted devices, etc.

Some embodiments provide for an E-UTRA network node, e.g., eNodeB (eNB) base station, a UTRA network node, e.g. Node B, base station, that can serve several HSDPA carriers and a wireless device. The wireless device is initially served from the network node, e.g., eNodeB, and makes measurements on the HSDPA carriers transmitted from the Node B. The eNodeB evaluates these measurement reports received from the wireless device and is responsible for issuing a radio resource controller (RRC) command to the wireless device to instruct the wireless device to hand over to the node B.

The cell change command contains a multicarrier HSDPA configuration. The multicarrier configuration includes a primary carrier and a number of secondary carriers. The primary carrier may also be known or interchangeably referred to as a primary serving cell and the secondary carriers can be referred to as secondary serving cells. That is, in some embodiments, the target primary serving cell and the target secondary serving cells in UTRA operate on the primary carrier and secondary carriers, respectively, which are indicated in the E-UTRA to UTRA cell change command message.

Some embodiments described herein ensure that the same handover interruption time is maintained for at least one of the HSDPA carriers for a multi-carrier handover from E-UTRAN as is the case for conventional single carrier handover. Prioritizing the primary carrier in this way will avoid performance degradation due to lengthy handovers involving multiple carriers and will quickly provide an initial service that can be used for maintaining QoS sensitive services. Furthermore, since interruption time on the primary carrier is maintained in the same way as is the case for conventional single carrier handover, when deploying a multiple-carrier handover, a need for re-optimization of handover related parameters and algorithms in the network will be mitigated.

An embodiment is described for the case of E-UTRA to UTRA cell change, but the principle also applies to the other cell change scenarios involving other RATs. Some embodiments provide for an E-UTRA network node, e.g., eNodeB, base station, and a UTRA network node, e.g., Node B, base station, that can serve several HSDPA carriers and a wireless device. In this embodiment, the wireless device may be initially served from the network node, e.g., eNodeB, and make measurements on the HSDPA carriers transmitted from the Node B.

Upon receiving a cell change command, the wireless device may stop receiving E-UTRA signals, e.g., physical downlink shared channel (PDSCH), and synchronize to the HSDPA cells on the UTRA carriers. The wireless device prioritizes the primary serving cell so that the wireless device has synchronized to that cell and is able to receive high speed (HS) PDSCH transmission time intervals (TTIs) at an earlier stage than is the case for a secondary serving cell.

Once the wireless device has synchronized to the primary serving cell, the wireless device uses some additional time to synchronize to the secondary serving cells. The synchronization to a cell here refers to the acquisition of cell timing or updating the previously known timing such that the wireless device can receive signals, e.g., PDSCH, from that cell. The wireless device may use known signals such as pilot signals, e.g., common pilot channel (CPICH) or shared channel (SCH), to synchronize to the transferee cell.

FIG. 1 is a diagram of an exemplary wireless communication system 10 having at least two nodes 12 and 14 serving a wireless device 16. The node 12 may be, for example, an eNodeB of a E-UTRAN system and node 14 may be, for example, a NodeB of a UTRAN system. In some other embodiments, the nodes 12 and 14 may be of the same radio access technology (RAT). In some embodiments, the nodes 12 and 14 may be or include a radio network controller (RNC) and/or a base station controller (BSC). In some embodiments, the node 12 or the node 14 may issue a cell change command to the wireless device 16 that directs the wireless device to handover from the first node 12 to the second node 14. The nodes 12 and 14 may include a processor, memory and transceivers, where the processor executes executable program code stored in the memory and the transceivers communicate with the wireless device 16.

The node 12 that is the node to which the wireless device 16 is initially attached may be referred to herein as the source node, the transferor node or transferring node. The node 14 to which the wireless device 16 is handed over may be referred to herein as the destination node, target node, or transferee node. Note that although only two nodes and one wireless device are shown in FIG. 1, actual wireless systems will have many nodes and many wireless devices.

In some embodiments, the method of cell change may be summarized as follows:

The wireless device 16 receives an RRC command from the node 12 specifying that the wireless device 16 should hand over from a cell or group of cells 13 (shown as a single cell in FIG. 1 for the sake of simplicity) associated with E-UTRAN node 12 to a multicarrier UTRAN node 14 consisting of a group of cells 15 that includes a primary serving cell, i.e., a first cell 18 from the group of cells 15, and multiple secondary serving cells, i.e., multiple other cells 20 from the group of cells 15;

The wireless device 16 stops receiving PDSCH transmission time intervals (TTIs) on E-UTRAN node 12 and begins the handover;

The wireless device 16 prioritizes synchronization to the primary serving cell of the transferee node 14;

After a first specified period of time, the wireless device 16 begins transmitting DPCCH on the UL frequency of the primary serving cell 18, and is able to be scheduled with HS-PDSCH on the primary serving cell 18;

While receiving and transmitting on the primary serving cell 18, the wireless device 16 continues to synchronize to the secondary serving cells 20; and After a second specified period of time, the wireless device 16 is scheduled on all of the secondary cells 20. Furthermore, if the wireless device 16 is configured with uplink multi-cell HSUPA, the wireless device 16 may start transmitting the dedicated physical control channel (DPCCH) on all remaining UL carriers 20 after the second specified period of time.

In some embodiments, the wireless device 16 is configured to handover from a first RAT to a second RAT. The wireless device 16 may comprise a processor and a memory. The memory contains instructions executable by the processor whereby the wireless device is configured to synchronize the wireless device to interoperate with the second RAT on a primary carrier within the first specified period of time, and to synchronize the wireless device to interoperate with the second RAT on a secondary carrier within the second specified period of time that ends after the first period of time. As used herein, the term "interoperate" refers to a condition in which the wireless device 16 communicates with the serving base station node on a specific carrier with timing of the wireless device on the specific carrier synchronized to the timing of the base station.

Figure 2:
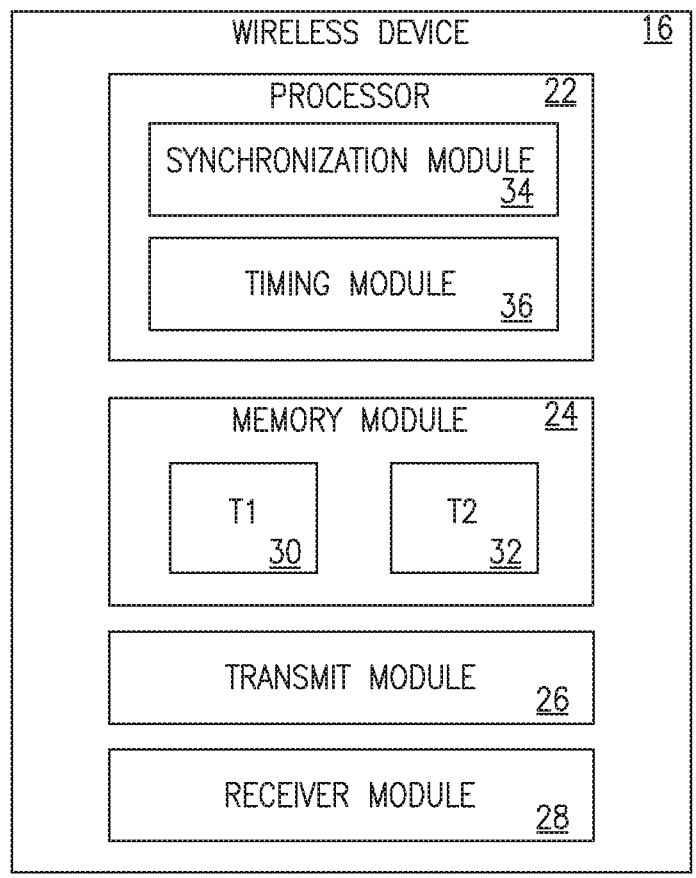
FIG. 2 is a block diagram of an embodiment of a wireless device.

FIG. 2 is a block diagram of a wireless device 16 constructed in accordance with principles of the present disclosure. The wireless device 16 includes a processor 22, a memory module 24, a transmit module 26, a receiver module 28. The memory module 24 is configured to store a first specified time period T1 30 and a second specified time period T2 32. Alternatively, the memory module 24 may store parameters from which the first T1 and second T2 periods of time may be computed. Examples of such parameters are discussed below. These time periods may be specified by a node of the transferring RAT or may be specified by a node of the transferee RAT. The memory module 24 may also include executable program code to instruct the processor 22 to execute functions described below in connection with the synchronization module 34 and timing module 36.

The receiver module 28 is configured to receive a cell change command from one of a node of a first (transferring) radio access technology (RAT) and node of a second (transferee) RAT. The transmitter module 26 is configured to transmit on a DPCCH of a first carrier at the end of the first specified period of time T1 30. The transmitter module 26 is further configured to transmit on a DPCCH of at least one secondary carrier at the end of the second specified period of time T2 32. The second specified period of time T2 32 ends after the first specified period of time T1 30 ends.

The processor 22 includes a synchronization module 34 and a timing module 36. The synchronization module 34 is configured to synchronize the wireless device to interoperate with the second RAT on the primary carrier within the first specified period of time Ti 30. The synchronization module 34 is also configured to synchronize the wireless device to interoperate with the second RAT on at least one secondary carrier within the second specified period of time T2 32. The timing module 36 is configured to time the first specified period time T1 30 and to time the second specified period of time T2 32.

Figure 3:
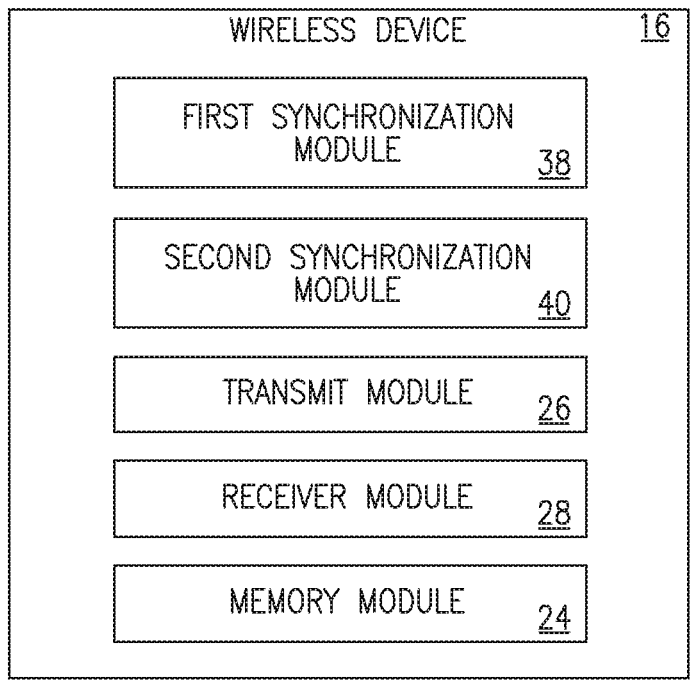
FIG. 3 is a block diagram of an alternative embodiment of a wireless device.

FIG. 3 is a block diagram of an alternative embodiment of the wireless device 16, which may be implemented to include software modules and hardware modules. In addition to the hardware/software modules 24, 26 and 28, described above, software modules include a first synchronization module 38 and a second synchronization module 40. The first synchronization module 38 includes software that, when executed by a processor, configures the processor to synchronize the wireless device 16 to interoperate with a first cell 18 of a second group of cells 15 within a first specified period of time T1 30. The second synchronization module 40 includes software that, when executed by a processor, configures the processor to synchronize the wireless device 16 to interoperate with at least one remaining cell 20 of the second group of cells 15 within the second specified period of time T2 32 that ends after an end of the first period of time T1 30.

Figure 4:
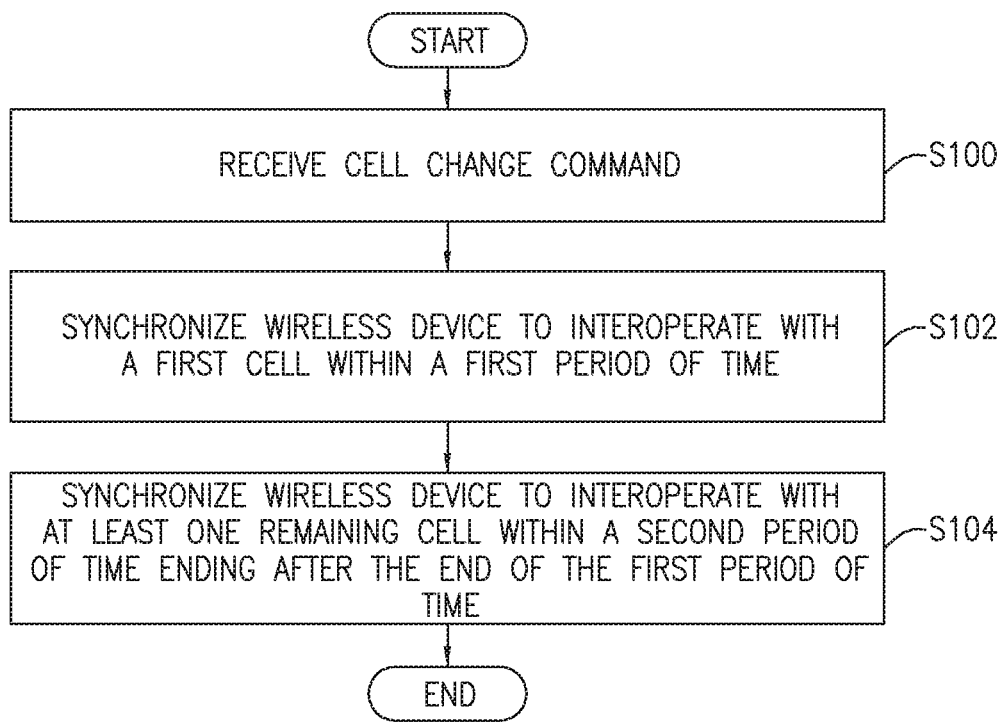
FIG. 4 is a flowchart of an exemplary process for cell change.

An exemplary process for effectuating cell change for a wireless device from a first group of cells 13 served by a first node 12 to a second group of cells 15 served by a second node 14 is described with reference to FIG. 4. A cell change command is received from a node 12 by a wireless device 16 camped on at least a first one of the first group of cells 13 (block S100). In response to the cell change command, the wireless device 16 synchronizes to interoperate with a first cell 18 of the second group of cells 15 within a first specified period of time T1 (block S102). The wireless device 16 also synchronizes to interoperate with at least one remaining cell 20 of the second group of cells 15 within a second period of time T2 that ends after an end of the first period of time T1 (block S104). In some embodiments, the wireless device 16 may begin to transmit on the first cell 18 of the second group of cells 15 after the end of the first period of time T1 but before the end of the second period of time T2. This enables the mobile device to achieve at least a 5 MHz bandwidth connection on a first cell within the first period of time T1, without waiting for synchronization of the secondary cells which occurs after the expiration of the first period of time T1.

Figure 5:
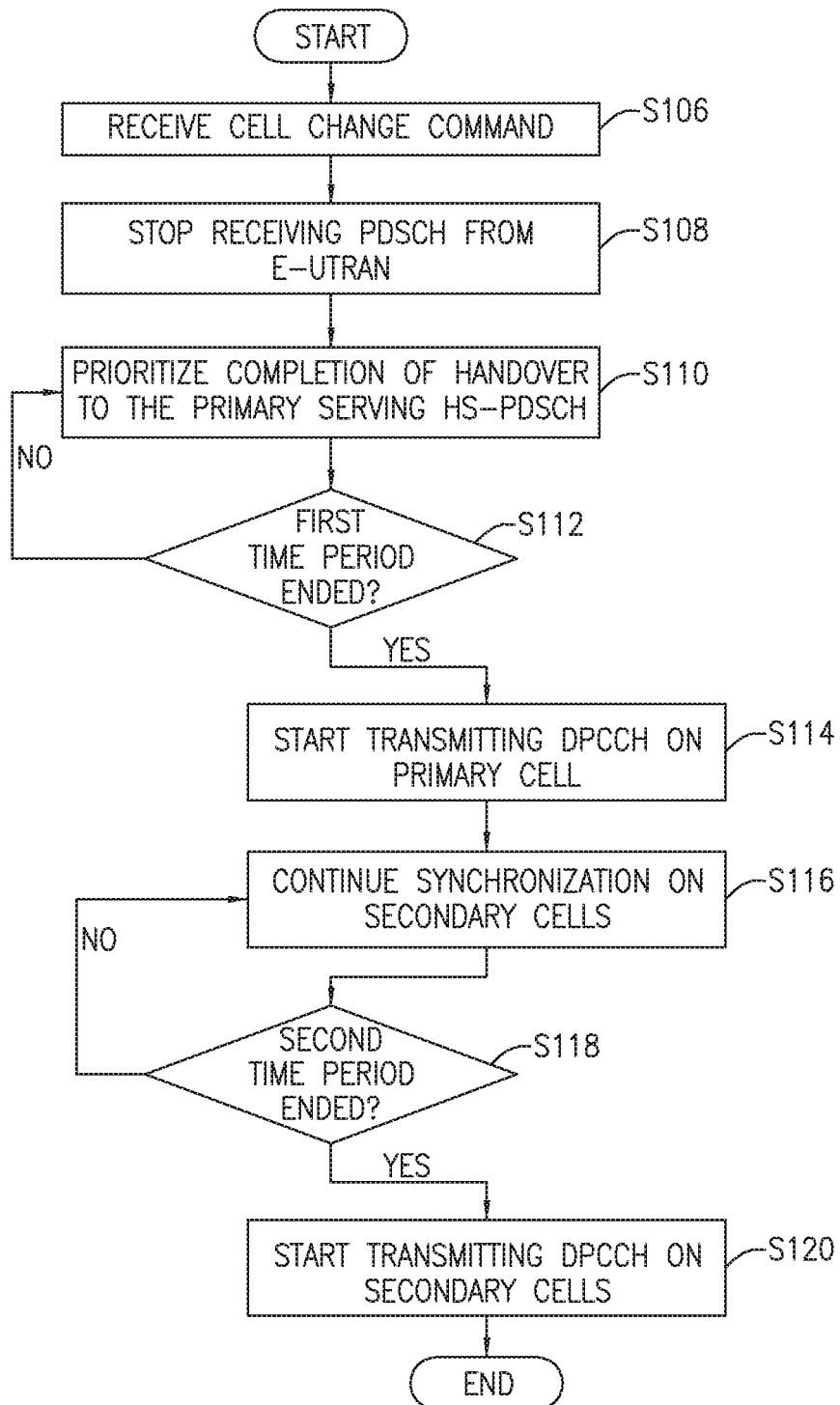
FIG. 5 is a more detailed flowchart of an exemplary process for cell change.

FIG. 5 is a more detailed flowchart of an exemplary process for achieving cell change for a wireless device from a first group of cells 13 of an E-UTRAN RAT to a second group of cells 15 of a UTRAN RAT. A cell change command is received at the wireless device (block S106). The wireless device 16 stops receiving a physical downlink shared channel (PDSCH) from the E-UTRAN (block S108). The wireless device 16 prioritizes synchronization such that completion of handover on a primary serving HS-PDSCH occurs before completion of synchronization of secondary cells (block S110). This step continues as long as a first time period T1 has not ended (block S112). When the synchronization of the primary serving cell is complete and the first time period T1 has expired, the wireless device 16 starts transmitting the DPCCH on the primary cell (block S114). Meanwhile, the wireless device 16 continues synchronization of the remaining secondary cells (block S116) during the second time period T2. When the second time period T2 ends (block S118) the wireless device 16 begins transmitting the DPCCH on the secondary carriers (block S120).

In some embodiments, when the target RAT, e.g., UTRA, contains multiple serving carriers, the wireless device performs a first handover to the primary serving cell of the target RAT within the first time period T1, and then performs a second handover to at least one secondary serving cell of target RAT within the second time period T2. The duration of the first and the second time periods, T1 and T2, may be the same or different. The second time period T2 may occur after the first time period T1 or they may partly overlap.

In yet another example, the wireless device may synchronize to two or more secondary serving cells sequentially, e.g., first, second and third secondary serving cells during second T2, third T3 and fourth T4 time periods, respectively. These time periods may also be stored in the memory module 24. These time periods may or may not overlap. The first time period T1 or second time period T2 may also be called handover delays or handover delay requirements. In some embodiments, a handover delay is the sum of a RRC procedure delay for processing the cell change command and an interruption time.

In some embodiments, after synchronizing to the primary serving cell, the wireless device may start synchronizing to the secondary serving cells (operating on secondary carriers) in a certain sequence or order. The order or sequence may be pre-defined, configured by the network node, e.g., included in the cell change command, or based on a pre-defined rule. In one example of a pre-defined rule, the order is based on the order or sequence in which the information about the secondary serving cells is signaled to the wireless device. For example, the wireless device may first synchronize to the first secondary carrier in the cell change command message and so on. In another example, the wireless device may first synchronize to the last secondary carrier in the cell change command message and so on.

Although the above embodiments are described for handover, they are applicable to any type of cell change where a wireless device is handed over to a target RAT with multiple-carriers (also known as "serving cells"). Examples of other cell change scenarios are RRC connection re-establishment, RRC connection release with redirection, etc. Note also that cell change may be performed between cells of the same RAT, in some embodiments.

Some wireless devices may not be capable of performing handover to a target RAT with multiple serving cells, e.g. primary and one or more secondary serving cells, by prioritizing the synchronization between different serving cells during handover. Therefore, in some embodiments, a wireless device that is capable of performing handover to a target RAT with multiple cells according to the procedure and requirements explained above, may signal capability information to the network node. In particular, the wireless device may report the capability to the network node via RRC signaling, e.g., to eNB, RNC, BSC, etc.

The receiving network node uses the acquired capability information for performing one or more radio operation tasks or radio resource management actions. Examples of radio operation tasks include whether or not to perform the handover to the target RAT with multiple serving cells or not, or specifying a number of secondary cells to include in the handover command sent to the wireless device.

Currently in 3GPP Specification 36.133, the interruption time requirement for a single carrier HSDPA configuration is specified as:

If the target cell is known, the interruption time shall be less than Tinterrupt1

$$T\text{interrupt1} = TIU + T\text{sync} + 50 + 10 * F\text{max ms}$$

If the target cell is unknown, the interruption time shall be less than Tinterrupt2

$$T\text{interrupt2} = TIU + T\text{sync} + 150 + 10 * F\text{max ms}$$

The variables in the equations above are as follows:

TIU is the interruption uncertainty when changing the timing from the E-UTRAN to the new UTRAN cell. TIU can be up to one UTRA frame (10 ms);

Fmax denotes the maximum number of radio frames within the transmission time intervals of all transport channels that are multiplexed into the same CCTrCH on the UTRA target cell; and Tsync is the time required for measuring the downlink DPCCH channel as stated in a technical standard (TS) 25.214, clause 4.3.1.2. In case higher layers indicate the usage of a post-verification period, Tsync=0 ms. Otherwise Tsync=40 ms.

These timing requirements should be met, provided that there is one target cell in the MOBILITY FROM E-UTRA command. Performance requirements for E-UTRA to UTRA soft handover are not specified. When the wireless device is connected to an E-UTRA cell, UTRA single frequency network (SFN) timing measurements are not reported. This implies that the timing of the DPCH of the UTRA target cells in the active set cannot be configured by UTRAN to guarantee that all target cells fall within the UE reception window of T0 +/−148 chips.

In embodiments described herein, the first specified period T1 for synchronizing the wireless device to the first cell is one of the two values, Tinterrupt1 and Tinterrupt2, depending on whether the target cell is known (Tinterrupt 1)

or unknown (Tinterrupt 2). The second specified period of time T2 for synchronizing the wireless device to additional cells may be given by:

$$Tinterrupt3 = TIU + Tsync + OC*150 + KC*50 + 10*Fmax \text{ ms}$$

KC is the number of known target cells in the message, and OC is the number of target cells that are not known in the message. Note that the first time period T1 expires before the expiration of the second time period T2, so that synchronization with the primary carrier completes before synchronization with the secondary carriers is complete. Thus, the first period of time may expire at time, Tinterrupt1 or Tinterrupt2, and the second period of time T2 may expire at time, Tinterrupt3, occurring after the first period of time.

Note that these equations are merely examples. Additional or alternative parameters may be employed to specify the first and second time periods. Note also that the numbers in these equation—10, 50, and 150—are non-limiting examples. Different values and/or parameters may be used to define the interrupt time. In another embodiment, another example of Tinterrupt3 is:

$$Tinterrupt3 = TIU + Tsync + Nsec*X + 10*Fmax \text{ ms}$$

In this equation, Nsec is the number of secondary carriers and X is a number of milliseconds.

As noted, performance requirements for E-UTRA to UTRA soft handover have not been specified by a current standard. When the wireless device is connected to an E-UTRA cell, UTRA SFN timing measurements are not reported. This implies that the timing of the DPCH of the UTRA target cells in the active set cannot be configured by the UTRAN to guarantee that all target cells fall within the wireless device reception window of T0 +/−148 chips. Thus, in some embodiments, prioritization of carrier handover is such that the UE can complete the handover to the primary carrier within a first specified period of time and handover to the secondary carriers within a second specified period of time that end after an end of the first specified period of time.

Other embodiments include:

Embodiment 1. A method of handover of a user equipment (UE), the handover being from a first node of a first radio access technology (RAT) to a multi-carrier configuration of a second node of a second RAT, the method comprising:
  receiving a handover command;
  synchronizing the UE to interoperate with the second node on a first primary carrier of the second RAT within a first specified period of time; and
  synchronizing the UE to interoperate with the second node on at least one secondary carrier of the second RAT within a second specified period of time ending after an end of the first specified period of time.

Embodiment 2. The method of Embodiment 1, wherein the first RAT is Enhanced Universal Terrestrial Radio Access (E-UTRA) and the second RAT is Universal Terrestrial Radio Access (UTRA).

Embodiment 3. The method of Embodiment 1, wherein the first specified period of time is a time between receiving the handover command and transmitting by the UE on a Dedicated Physical Control Channel (DPCCH).

Embodiment 4. The method of Embodiment 1, wherein the second specified period of time is a time between receiving the handover command and scheduling by the UE of a high speed shared control channel (HS-SCCH) on at least one secondary carrier.

Embodiment 5. The method of Embodiment 1, wherein the second specified period of time is a time between receiving the handover command and transmitting by the UE of DPCCH on at least one secondary carrier.

Embodiment 6. A UE configured to handover from a first radio access technology (RAT) to a second RAT, the UE comprising a processor and a memory, the memory containing instructions executable by the processor whereby the UE is operative to:
  synchronize the UE to interoperate with the second RAT on a primary carrier within the first specified period of time; and
  synchronize the UE to interoperate with the second RAT on a secondary carrier within the second specified period of time that ends after the first period of time.

Embodiment 7. The UE of Embodiment 6, wherein the first RAT is Enhanced Universal Terrestrial Radio Access (E-UTRA) and the second RAT is Universal Terrestrial Radio Access (UTRA).

Embodiment 8. The UE of Embodiment 6, wherein the first specified period of time is a time between receiving the handover command and transmitting by the UE on a Dedicated Physical Control Channel (DPCCH).

Embodiment 9. The UE of Embodiment 6, wherein the second specified period of time is a time between receiving the handover command and scheduling by the UE of a high speed shared control channel (HS-SCCH) on at least one secondary carrier.

Embodiment 10. The UE of Embodiment 6, wherein the second specified period of time is a time between receiving the handover command and transmitting by the UE of DPCCH on at least one secondary carrier.

Embodiment 11. A UE configured to handover from a first radio access technology, RAT, to a second RAT, the UE comprising:
  a receiver module configured to:
    receive a handover command from one of a node of the first RAT and a node of the second RAT;
  a transmitter module configured to:
    transmit on a DPCCH of the first carrier at the end of a first specified period of time; and
    transmit on a DPCCH of a secondary carrier at the end of a second specified period of time that ends after the end of the first specified period of time; and
  a synchronizer module in communication with the transmitter module and the receiver module, the synchronizer module configured to:
    synchronize the UE to interoperate with the second RAT on the primary carrier within the first specified period of time; and
    synchronize the UE to interoperate with the second RAT on the secondary carrier within the second specified period of time; and
  a timing module configured to time the first specified period of time and to time the second specified period of time.

Embodiments can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method of cell change involving a wireless device, the cell change being from a first group of cells to a multi-cell configuration of a second group of cells, the method comprising:
   receiving a cell change command;
   synchronizing the wireless device to interoperate with a first cell of the second group of cells within a first specified period of time; and
   synchronizing the wireless device to interoperate with at least one remaining cell of the second group of cells within a second specified period of time ending after an end of the first specified period of time, wherein the second specified period of time is given by:

$$T\text{interrupt3} = TIU + T\text{sync} + OC*150 + KC*50 + 10*F_{MAX} \text{ ms,}$$

where TIU is an interruption uncertainty when changing from an Enhanced Universal Terrestrial Radio Access, E-UTRA, technology to a Universal Terrestrial Radio Access, UTRA, technology, $F_{MAX}$ denotes a maximum number of radio frames within transmission time intervals, TTI, of all transport channels that are multiplexed into a same coded composite transport channel, CCTrCH, on a target cell of the UTRA, TSYNC is a time required for measuring a downlink dedicated physical control channel, DPCCH, KC is a number of known target cells in a message, and OC is a number of target cells that are not known in the message.

2. The method of claim 1, further comprising commencing transmission of a signal from the wireless device on the first cell after the end of the first period of time but before the end of the second period of time.

3. The method of claim 1, wherein each cell of the first group of cells is transmitted on a different carrier, and each cell of the second group of cells is transmitted on a different carrier.

4. The method of claim 1, wherein the first cell is a secondary cell and the at least one remaining cell includes a primary cell.

5. The method of claim 1, wherein the synchronizing of the wireless device to interoperate with at least one remaining cell begins after the synchronizing of the wireless device to interoperate with the first cell.

6. The method of claim 1, wherein the synchronizing of the wireless device to interoperate with the at least one remaining cell begins during the synchronizing of the wireless device to interoperate with the first cell.

7. The method of claim 1, wherein the first group of cells are of a first radio access technology, RAT, and the second group of cells are of a second RAT different from the first RAT.

8. The method of claim 7, wherein the first RAT is Enhanced Universal Terrestrial Radio Access, E-UTRA, and the second RAT is Universal Terrestrial Radio Access, UTRA.

9. The method of claim 1, wherein the first specified period of time is a time between receiving the cell change command and transmitting by the wireless device on a Dedicated Physical Control Channel, DPCCH.

10. The method of claim 1, wherein the second specified period of time is a time between receiving the cell change command and scheduling by the wireless device of a high speed shared control channel, HS-SCCH, on at least one of the at least one remaining cells.

11. The method of claim 1, wherein the second specified period of time is a time between receiving the cell change command and transmitting by the wireless device of a dedicated physical control channel, DPCCH, on at least one of the at least one remaining cells.

12. The method of claim 1, wherein the cell change command is a handover command.

13. A wireless device configured to handover from a first group of cells to a second group of cells, the wireless device comprising:
    a memory, the memory configured to store a first specified period of time and a second specified period of time;
    a processor in communication with the memory, the processor configured to:
      receive a cell change command;
      synchronize the wireless device to interoperate with a first cell of the second group of cells within the first specified period of time;
      synchronize the wireless device to interoperate with at least one remaining cell of the second group of cells within the second specified period of time that ends after and end of the first period of time; and
    a receiver module configured to receive a cell change command from a base station node serving the first group of cells, wherein the second specified period of time is given by:

$$T\text{interrupt3} = TIU + T\text{sync} + OC*150 + KC*50 + 10*F_{MAX} \text{ ms,}$$

where TIU is an interruption uncertainty when changing from an Enhanced Universal Terrestrial Radio Access, E-UTRA, technology to a Universal Terrestrial Radio Access, UTRA, technology, $F_{MAX}$ denotes a maximum number of radio frames within transmission time intervals, TTI, of all transport channels that are multiplexed into a same code composite transport channel, CCTrCH, on a target cell of the UTRA, TSYNC is a time required for measuring a downlink dedicated physical control channel, DPCCH, KC is a number of known target cells in a message, and OC is a number of target cells that are not known in the message.

14. The wireless device of claim 13, further comprising a transmitter module configured to begin transmitting a signal from the wireless device on the first cell after the end of the first period of time but before the end of the second period of time.

15. The wireless device of claim 13, wherein each cell of the first group of cells is transmitted on a different carrier, and each cell of the second group of cells is transmitted on a different carrier.

16. The wireless device of claim 13, wherein the first group of cells is transmitted using one RAT and the second group of cells is transmitted using a second RAT.

17. The wireless device of claim 13, wherein the first cell is a primary cell and the at least one remaining cell is a secondary cell.

18. The wireless device of claim 13, wherein the first cell is a secondary cell and the at least one remaining cell includes the primary cell.

19. The wireless device of claim 13, wherein the synchronizing of the wireless device to interoperate with the at least one remaining cells begins after the synchronizing of the wireless device to interoperate with the first cell.

20. The wireless device of claim 13, wherein the synchronizing of the wireless device to interoperate on the at least one remaining cells begins during the synchronizing of the wireless device to interoperate on the first cell.

21. A wireless device configured to handover from a first group of cells to a second group of cells, the wireless device comprising:
a memory module configured to store a first specified period of time and a second specified period of time;
a receiver module configured to receive a cell change command;
a first synchronization module configured to synchronize the wireless device to interoperate with a first cell of the second group of cells within the first specified period of time; and
a second synchronization module configured to synchronize the wireless device to interoperate with the at least one remaining cell of the second group of cells within the second specified period of time that ends after an end of the first period of time, wherein the second specified period of time is given by:

$T\text{interrupt3} = TIU + T\text{sync} + OC*150 + KC*50 + 10*F_{MAX}$ ms, where TIU is an interruption uncertainty when changing from an Enhanced Universal Terrestrial Radio Access, E-UTRA, technology to a Universal Terrestrial Radio Access, UTRA, technology, $F_{MAX}$ denotes a maximum number of radio frames within transmission time intervals, TTI, of all transport channels that are multiplexed into a same coded composite transport channel, CCTrCH, on a target cell of the UTRA, TSYNC is a time required for measuring a downlink dedicated physical control channel, DPCCH, KC is a number of known target cells in a message, and OC is a number of target cells that are not known in the message.

22. The wireless device of claim 21, further comprising a transmit module configured to begin transmitting signals from the wireless device on the first cell after the end of the first period of time but before the end of the second period of time.

23. The wireless device of claim 21, wherein the first group of cells is transmitted using one RAT and the second group of cells is transmitted using a second RAT.

24. The wireless device of claim 23, wherein the first RAT is Enhanced Universal Terrestrial Radio Access, E-UTRA, and the second RAT is Universal Terrestrial Radio Access, UTRA.

25. The wireless device of claim 21, wherein the first specified period of time is a time between receiving the cell change command and transmitting by the wireless device on a Dedicated Physical Control Channel, DPCCH.

26. The wireless device of claim 21, wherein the second specified period of time is a time between receiving the cell change command and scheduling by the wireless device of a high speed shared control channel, HS-SCCH, on at least one of the at least one remaining cell.

27. The wireless device of claim 21, wherein the second specified period of time is a time between receiving the cell change command and transmitting by the wireless device of a dedicated physical control channel, DPCCH, on at least one of the at least one remaining cell.

\* \* \* \* \*